United States Patent [19]

Ono et al.

[11] Patent Number: 4,844,532
[45] Date of Patent: Jul. 4, 1989

[54] SUN-ROOF APPARATUS FOR VEHICLE

[75] Inventors: Jun Ono; Michio Tamura, both of Wako, Japan

[73] Assignee: Honda Giken Koygo Kabushiki Kaisha, Tokyo, Japan

[21] Appl. No.: 102,685

[22] Filed: Sep. 30, 1987

[30] Foreign Application Priority Data

Oct. 1, 1986 [JP] Japan .................... 61-234145

[51] Int. Cl.$^4$ ................................ B60J 7/00
[52] U.S. Cl. .................... 296/213; 296/208; 296/214; 296/216
[58] Field of Search .......... 296/213, 214, 216, 221, 296/223, 208

[56] References Cited

U.S. PATENT DOCUMENTS

| 3,165,352 | 1/1965 | Hallock et al. | 296/100 |
| 4,085,965 | 4/1978 | Schlapp | 296/213 |
| 4,175,784 | 11/1979 | Schatzler et al. | 296/214 |
| 4,289,349 | 9/1981 | Symeonidis | 296/213 |
| 4,320,921 | 3/1982 | Schatzler | 296/214 X |
| 4,332,416 | 6/1982 | Lutz et al. | 296/221 X |
| 4,664,439 | 5/1987 | Schaetzler | 296/213 |
| 4,709,959 | 12/1987 | Paerisch et al. | 296/221 X |

FOREIGN PATENT DOCUMENTS 3444606  7/1985  Fed. Rep. of Germany ...... 296/221

Primary Examiner—Dennis H. Pedder
Attorney, Agent, or Firm—Armstrong, Nikaido, Marmelstein, Kubovcik & Murray

[57] ABSTRACT

A sun-roof apparatus for a vehicle which comprises a sun-roof frame forming a gutter having at least two side portions and at least one raised rear portion at a higher height than the side portions, and interposed between the side portions. The gutter is provided under a roof outer plate having an opening opened and closed by a sun-roof panel. The gutter extends along at least three peripheral edges of the opening. An interior plate is arranged under the raised rear portion of the gutter. The interior plate is raised higher than the two side portions of the gutter and capable of moving between a closed position opposed to the opening and unopened position moved backward to a rear of the opening. A drain conduit is connected to each of the two side portions of the gutter. A connecting passage is arranged under the interior plate, wherein ends of the two side portions of the gutter which are close to one of the raised side portions are connected by a recessed groove. The recessed groove is provided in the sun-roof frame in the manner continuous with the gutter side portions and at a position below one of the raised rear portions of the gutter. The recessed groove contains a rear box of an opening and closing unit for controlling opening and closing of the sun-roof panel, and a pair of bank plates are provided between the groove and the side portions of the gutter formed in the sun-roof frame. Each bank plate has an opening therein and a connecting passage which is connected to each bank plate at the opening and arranged beneath the interior plate and within the groove.

16 Claims, 7 Drawing Sheets

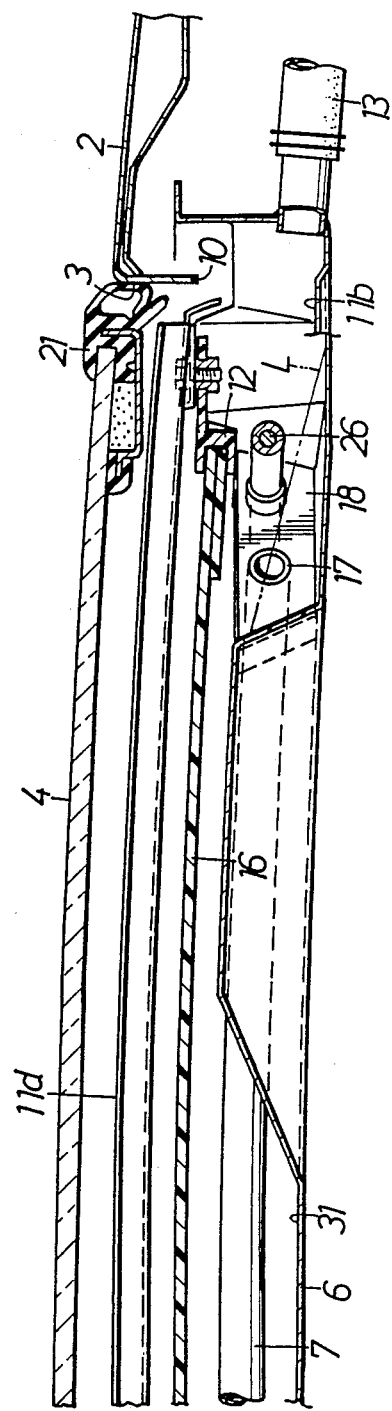

SUN-ROOF APPARATUS FOR VEHICLE

BACKGROUND OF THE INVENTION

1. Field of the Invention

The present invention relates to a sun-roof apparatus used on a roof of a vehicle, mainly an automobile and, more particularly, to improvements in a sun-roof apparatus comprising a gutter provided under a roof outer plate having an opening opened and closed by a sun-roof panel, the gutter extending along a peripheral edge of the opening, an interior plate arranged under one raised side portion of the gutter which is raised higher than other side portions of the gutter and capable of moving between a closed position opposed to the opening and an open position moved backward to a side of the opening, and a drain conduit connected to two side portions of the gutter opposed to each other with the one raised side portion interposed therebetween.

The above-mentioned gutter receives rainwater or washing water coming from between the peripheral edge of the opening and the sun-roof panel to guide the water to the drain conduit.

2. Description of the Prior Art

It is effective in such a sun-roof apparatus to raise one side portion of the gutter higher than other side portions so as to cross the upper portion of the interior plate to form the apparatus shallow, thereby approaching the interior plate as close to the roof outer plate as possible so as to obtain a driver's large head clearance in a vehicle compartment, and this prior art is heretofore in practice. (For example, see Japanese Patent Laid-open No. 81220/1984)

However, if the one side portion of the gutter is raised as described above, the water cannot be delivered between the opposed two side portions of the gutter through the one raised side portion of the gutter. Thus, when a vehicle body is inclined and one end of the one raised side portion is placed at the lowermost position of the gutter, such a disadvantage occurs that the water overflows from a dead end portion of the upper side of the opposed two side portions of the gutter.

SUMMARY OF THE INVENTION

An object of the present invention is to provide a sun-roof apparatus for a vehicle which can eliminate the above-mentioned drawback.

In order to achieve the above and other objects, according to the present invention, there is provided a sun-roof apparatus in which the two opposed side portions of gutter between which the one raised side portion is placed are connected with each other at their ends adjacent the one raised side portion through a connecting passage arranged under the interior plate.

According to the construction described above, the two opposed side portions of the gutter through the one side portion of the gutter crossing above the interior plate can be connected together so as to deliver water therebetween through the connecting passage. Therefore, even if the vehicle body is inclined and one end of the one side portion of the gutter is placed at the lowermost position, the water is fed from the dead end portion of the upper side of the opposed two side portions of the gutter to the connecting passage to flow into the lower side portion of the gutter. Thus, the water is prevented from overflowing from the dead end portion of the upper side portion of the gutter.

In addition to the above-mentioned structure, if the connecting passage is formed to have a closed cross section, even when the water is gathered in passage, the water droplets are prevented from being adhered to the lower surface of the interior plate due to the evaporation or splashing of the gathered water.

BRIEF DESCRIPTION OF THE DRAWINGS

FIG. 9 is a sectional view taken along the line IX—IX in FIG. 8.

DESCRIPTION OF THE PREFERRED EMBODIMENT

Figure 1:
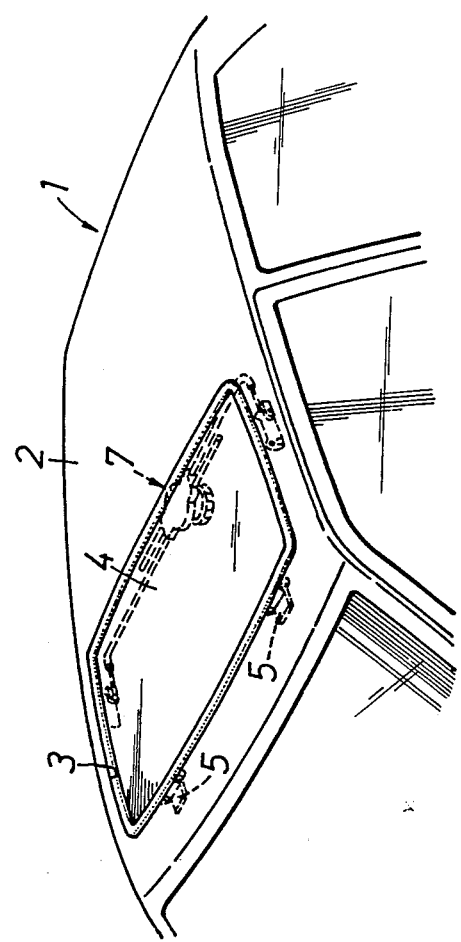
FIG. 1 is a perspective view of an automobile having a sun-roof apparatus of the present invention.
Figure 2:
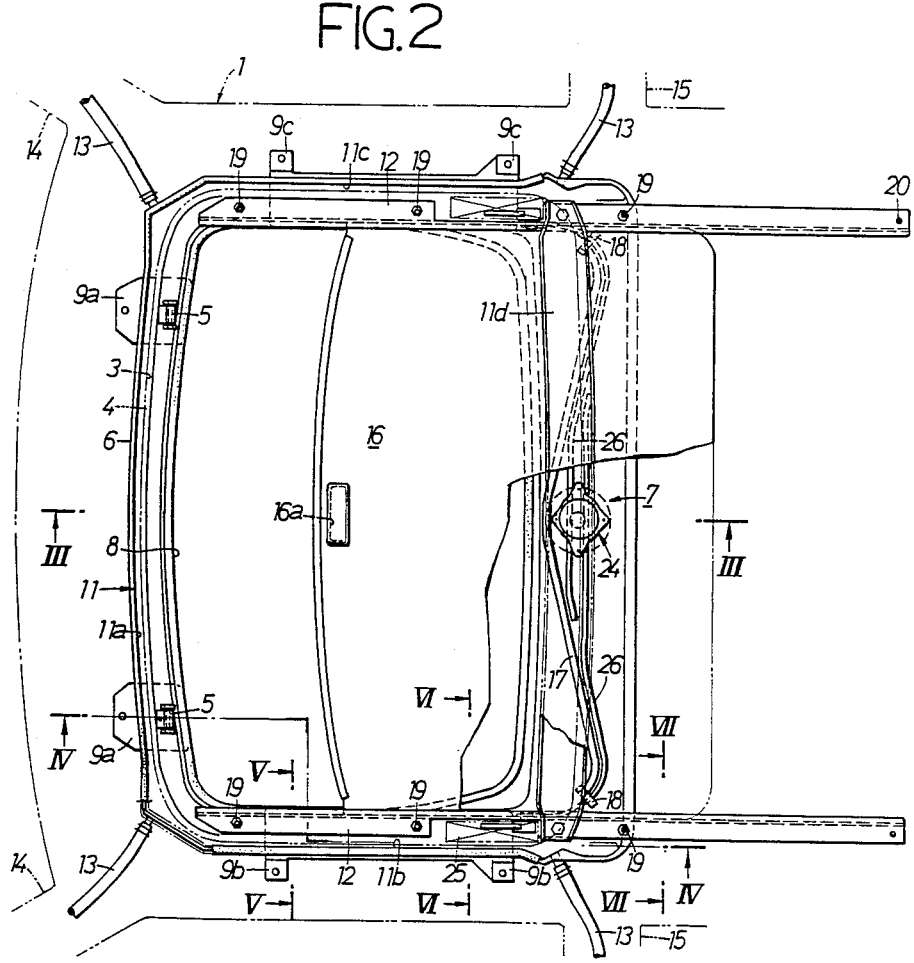
FIG. 2 is a partially cutaway plan view of the sunroof apparatus (taken along the line II—II in FIG. 3)

An embodiment of a sun-roof apparatus according to the present invention will be described with reference to the drawings. In FIG. 1, a rectangular outer window 3 is formed as an opening at the front portion of a roof outer plate or panel 2 of a vehicle body 1. A sun-roof panel 4 formed of a translucent material is vertically tiltably attached at the front end thereof to a sun-roof frame 6 to be described later through a pair of right and left hinges 5 and 5 to open or close the outer window 3 (FIG. 2). The translucent material of the sun-roof panel 4 can be a transparent material. In other words, the outer window 3 is opened and closed by tilting up or down the sun-roof panel 4 by means of an opening and closing unit 7 to be described later.

Figure 3:
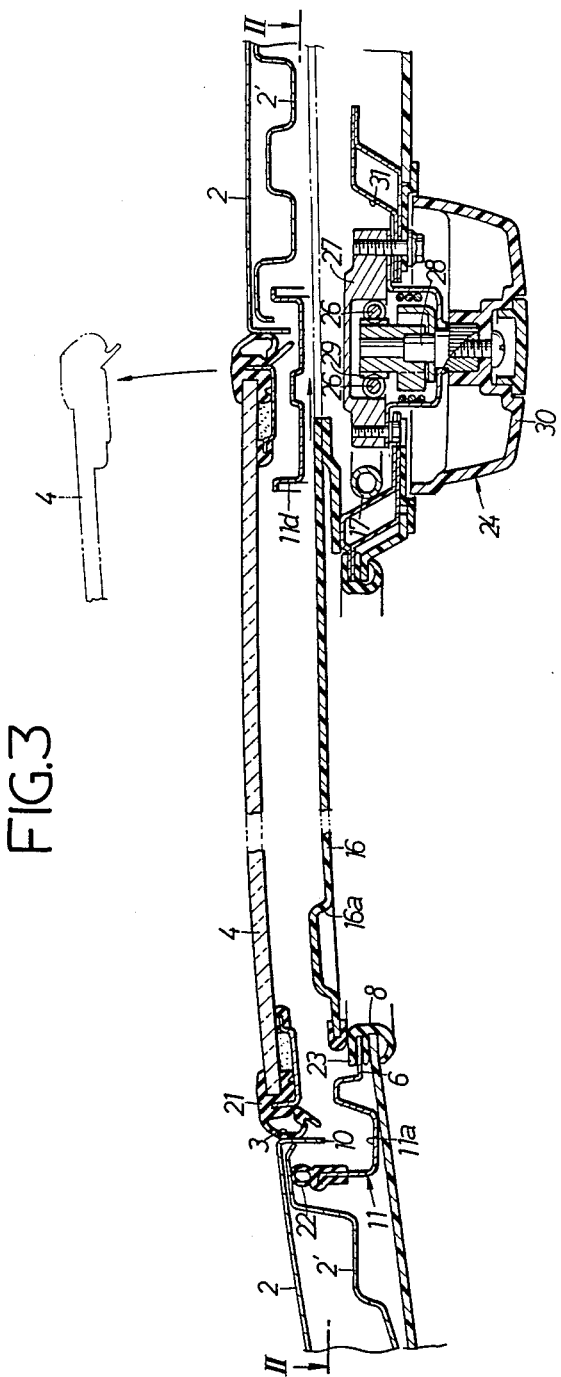
FIGS. 3, 4, 5 and 7 are sectional views taken along the lines III—III, IV—IV, V—V, VI—VI and VII—VII in FIG. 2.

In FIGS. 2 and 3, a rectangular sun-roof frame 6 having an inner window 8 contained in the lower projection range of the outer window 3 is arranged under the roof panel 2. The sun-roof frame 6 is fixed in place by securing brackets 9a, 9b and 9c projected from the front, left and right sides of the sun-roof frame 6, by screws, to the vehicle body 1.

A gutter 11 is formed in the sun roof frame 6. The gutter 11 receives therein a drain plate 10 suspended from the peripheral edge of the outer window 3 and surrounds the inner window 8. The gutter 11 has a generally rectangular shape as a whole and comprises a front side gutter portion 11a, a left side gutter portion 11b and a right side gutter portion 11c where are press-formed at the front, left and right side portions of the sun-roof frame 6 respectively, and a rear side gutter portion 11d fixed through a sunshade rail 121 (FIG. 9) to be described later to the rear side portion of the sun-roof frame 6. The rear side gutter 11d portion is raised from or located higher than the other side gutter portions 11a, 11b and 11c by the height of the sunshade rail 12 and therefore is shallower than the other portions. The bottom plates of opposite ends of the rear gutter portion 11d are bent downward and exposed onto the left and right side gutter portions 11b and 11c so that water is reliably dropped from the rear side gutter portion 11d to the left and right side gutter portions 11b and 11c.

Drain conduits 13, 13, . . . are respectively connected to the outer walls at four corners of the gutter 11, and are opened at their lower ends into the hollow portions of front pillars 14, 14 and center pillars 15, 15 of the body 1. Since the hollow portions of the front pillars 14, 14 and the center pillars 15, 15 communicate with drain openings (not shown) formed in the lower portion of the body 1, the water guided into the drain conduits 13 is discharged out of the body 1 from the drain openings.

The inner window 8 defined by the sun-roof frame 6 is opened and closed by a light shading sunshade panel 16 as an interior plate which slides longitudinally of the vehicle below the rear side gutter portion 11d while being guided by a pair of right and left sunshade rails 12, 12. Thus, by forming the sunshade panel 16 so as to pass below the raised rear side gutter portion 11d as mentioned above, the panel 16 can be provided near the roof outer plate 2. Moreover, the roof is formed thin thereby increasing a driver's head clearance in a compartment.

A connecting conduit 17 is arranged as a connecting passage for connecting the rear ends of left and right side gutter portions 11b and 11c while extending below the sunshade panel 16. The ends of the connecting conduit 17 are directed to the left and right side gutter portions 11b and 11c and are fitted into and fixed to trapezoidal bank plates 18 fixed to the sunroof frame 6 as shown in FIG. 9.

Figure 5:
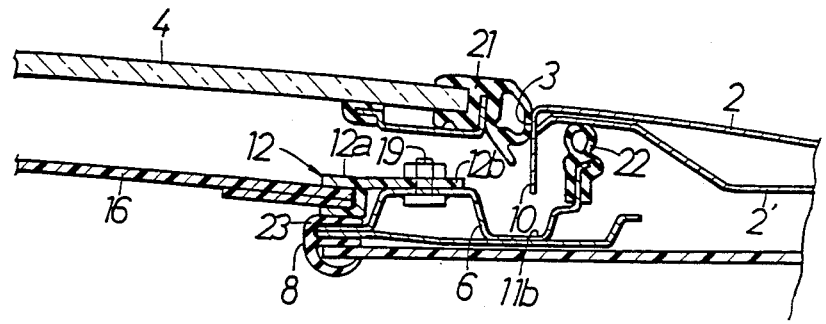
Figure 6:
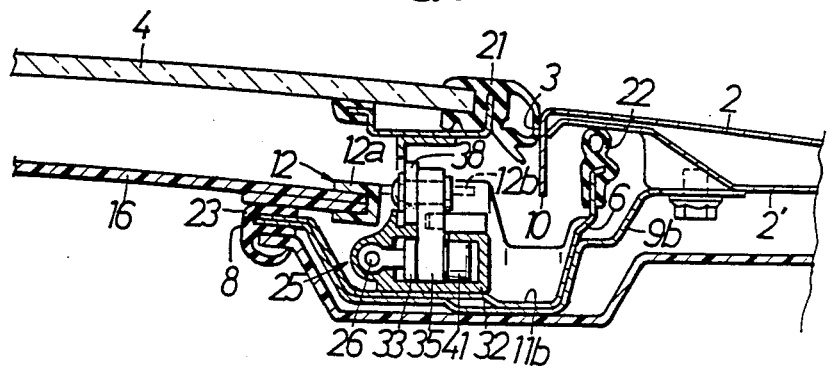
Figure 7:
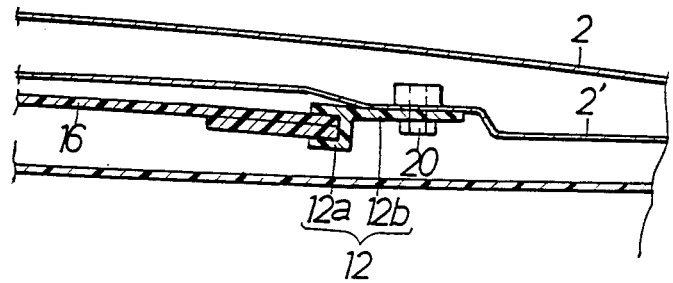

The sunshade rails 12, 12 are, as shown in FIG. 2, arranged on the sun-roof frame 6 so as to extend along the right and left side edges of the inner window 8, up to positions and are extended rearwardly of the sun-roof frame 6. Each sunshade rail 12 comprises, as shown in FIGS. 5 to 7, a rail section 12a of U-shaped cross section with which the side end of the sunshade panel 16 is slidably engaged, and a mount 12b projected horizontally from an upper portion of the back surface of the rail section 12a. The mount 12b is fixed at its essential portion by a plurality of bolts 19, . . . , to the sun-roof frame 6 (FIG. 5), and is also fixed at its rear end by a bolt 20 to a roof inner plate 2' (FIG. 7).

A hand holding recess 16a is formed on the lower surface of the front portion of the sunshade panel 16. When a driver puts his fingers to the recess 16a to slide the sunshade panel 16 longitudinally along both the sunshade rails 12, 12, the panel 16 moves to an advanced position (FIG. 3) covering the window 8 from above to close it or to a retracted position backward of the inner window 8 to open it, or to any intermediate position partly opening the inner window 8 (FIG. 2).

In the embodiment described above, a weather strip 21 is attached to the peripheral edge of the sun-roof panel 4 in a waterproof manner coming into intimate contact with an inside surface of the drain plate 10. A sealing member 22 which is intimately contacted with the roof inner plate 2' is attached to the outer edges of the three side portions except the rear side portion of the sun-roof frame 6, and a sealing member 23 which can be intimately contacted with the sunshade panel 16 is attached to the inner edge of the sun-roof frame 6.

Referring back to FIG. 2, the opening and closing unit 7 for the sun-roof panel 4 comprises a driving mechanism 24 provided at the center of the rear side portion of the sun-roof frame 6, a pair of tilting mechanisms 25, 25 provided at both right and left side portions of the sun-roof frame 6, and a pair of push-pull wires 26, 26 for operative connection between the driving mechanisms 24 and both the tilting mechanisms 25, 25. These mechanisms will be sequentially described.

The driving mechanism 24 comprises, as shown in FIG. 3, a gear box 27 fixed to the rear side portion of the sun-roof frame 6, a rotational shaft 28 supported to the lower wall of the gear box 27, a pinion gear 29 fixed to the inner end of the shaft 28 and contained in the gear box 27, and a rotary knob 30 disposed below the sun-roof frame 6 and fixed to the outer end of the shaft 28. At front and rear sides of the pinion gear 29 are engaged the outer peripheral surfaces of inner wires of the pair of push-pull wires 26, 26. Therefore, when the rotary knob 30 is rotated normally or reversely, the pair of push-pull wires 26, 26 can be pushed away from or pulled toward each other in opposite directions by the rotation of the pinion gear 29.

Figure 8:
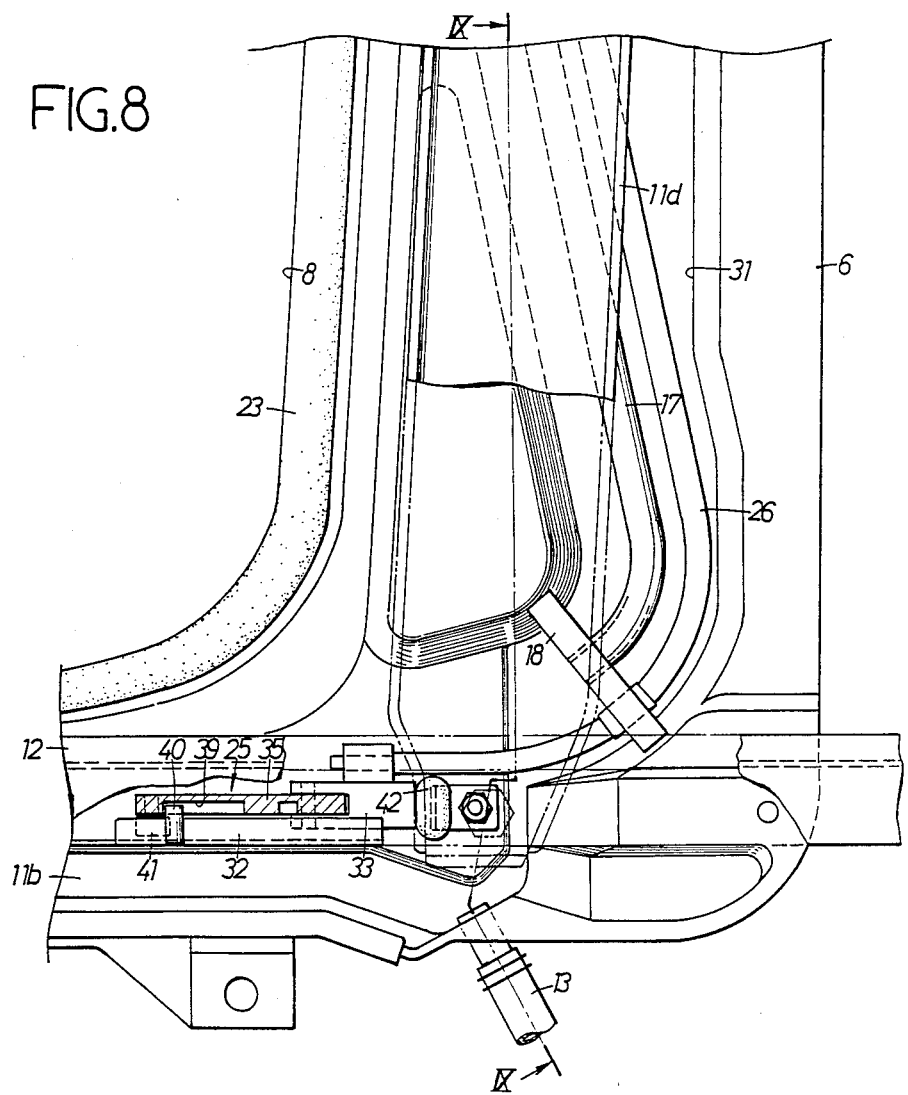
FIG. 8 is an enlarged view of an essential portion of FIG. 2.

The gear box 27 is contained in a recessed groove 31 formed on the upper surface of the rear side portion of the sun-roof frame 6 to avoid the interference with the sliding sunshade panel 16, and the connecting conduit 17 is also arranged to run in the recessed groove 31. To interrupt the communication of the recessed groove 31 with the left and right side gutter sections 11b and 11c, the bank plates 18, 18 are provided at opposite ends of the recessed groove 31 (FIGS. 8 and 9). Intermediate portions of the outer wires of the push-pull wires 26, 26 are supported watertightly on the bank plates 18, 18 side by side with respect to the conduit 17.

Since the structures of the right and left tilting mechanisms 25, 25 are the same, the left tilting mechanism 25 will be described with reference to FIGS. 4 and 6. The tilting mechanism 25 comprises a guide rail 32 fixed to the left side portion of the sun-roof frame 6 side by side with respect to the sunshade rail 12, a slider 33 slidable longitudinally in the guide rail 32, a link 35 tiltably coupled at its rear end through a pivot pin 34 with the slider 33, and a supporting rod 38 having a slot 37 for slidably engaging a pivot pin 36 at the front end of the link 35. The rod 38 is fixed to the sun-roof panel 4. The inner wire of one of the push-pull wires 26 is connected to the rear end of the slider 33.

A cam groove 39 comprising a linear groove 39a and a U-shaped curved groove 39b connected to the rear end of the groove 39a is formed at one side of the link 35, and a guide pin 40 engaged with the cam groove 39 is fixed to the guide rail 32. A lock pin 41 is fixed to the link 35 and is brought into engagement with the guide rail 32 when the link 35 falls down so as to prevent the link 35 from rising up.

Figure 4:
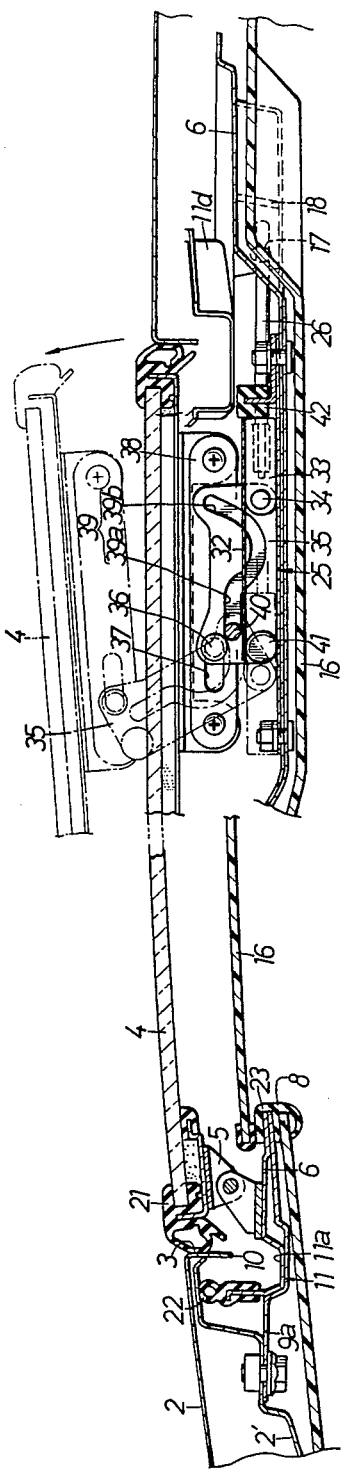

In FIG. 4, reference numeral 42 denotes a stopper provided at the sun-roof frame 6 for restricting the retracting limit of the slider 33.

The sun-roof panel 4 is tilted down by the link 35 to close the outer window 3 when the link 35 falls down as designated by solid lines in FIG. 4. Such a state is provided by the pulling operation of the associated push-pull wire 26 by the driving mechanism 24. When the push-pull wire 26 is pushed contrary to the above operation, the link 35 is pushed by the slider 33, and the pivot pin 36 first moves forward in the fallen-down state of the link 35 until the pivot pin 36 abuts against the front end wall of the slot 37 of the supporting rod 38. During this time, the lock pin 41 of the link 35 is disengaged from the guide rail 32 and the guide pin 40 passes the linear groove 39a of the cam groove 39 and comes to the entrance of the curved groove 39b. Thereafter, when the link 35 is further pushed by the slider 33, the link 35 moves to rise up as designated by broken lines in FIG. 4 around the pivot pin 34 as an axis of rotation by the guiding operation of the stationary guide pin 40 with respect to the curved groove 39b, thereby tilting up the sun-roof panel 4 through the supporting rod 38 to open the outer window 3.

The operation of the embodiment will now be described. When rainwater or the like come from the peripheral edge of the outer window 3, the water is dropped along the drain plate 10 into the gutter 22, and is guided to the drain conduits 13 on the downstream side.

Since the rear side gutter portion 11d is provided above the sunshade panel 16 to cross the same, the sunshade panel 16 is not made dirty by the rainwater or the like coming from the rear edge of the outer window 3. Even with the arrangement that the rear side gutter portion 11d is raised and formed shallow, since the water introduced to the rear side gutter portion 11d immediately flows to the right and left and drops into the left and right side deep gutter portions 11b and 11c, the water does not overflow from the rear side gutter portion 11d.

If a large quantity of rainwater is coming into the gutter 11 when the vehicle body 1 is parked, for example, in the state that the rear portion of the right side of the body 1 is inclined downward, the water gathered at the rear end of the left side gutter portion 11c assuming a higher position may be at a level as shown by a line L in FIG. 9. The water does not flow to one drain conduit 13 located on its adjacent outer side, nor to the raised rear side gutter portion 11d. However, since the rear end of the left side gutter portion 11f is communicated through the connecting conduit 17 to the rear end of the right side gutter portion 11c, the water in the left side gutter portion 11b is fed through the connecting conduit 17 to the right side gutter portion 11c to be guided to its adjacent drain conduit 13. Thus, the water is prevented from overflowing from the rear end of the left side gutter portion 11b in this case.

When the body 1 is inclined with the rear portion of the left side of the body 1 being inclined downward, it is understood by the above-mentioned operation that the water gathered at the rear end of the right side gutter portion 11c at the upper position is fed through the connecting conduit 17 to the left side gutter portion 11b.

The manner of opening and closing the sun-roof panel 4 is not limited to the tilting type as described in the above embodiment. For example, detachable type, sliding type or the like may also be arbitrarily employed. For the connecting conduit 17 as a connecting passage, a flexible tube such as a vinyl tube and, a rubber tube or a metal tube, such as an extracted tube or a welded tube may b used. By employing the connecting conduit 17 of a closed cross section, even if the water is gathered in the connecting conduit 17, water droplet is desirably prevented from being adhered to the lower surface of the sunshade panel 16 due to the evaporation or splashing of the water.

Contrary to the embodiment described above, the sunroof panel may be of a light-shading material and the interior plate may be formed of a translucent material. The translucent material can be a transparent material.

What is claimed is:

1. A sun-roof apparatus for a vehicle having a roof outer plate which is formed with an opening, comprising: a sun-roof panel for opening and closing said opening, a gutter provided below the roof outer plate and extending to surround a peripheral edge of said opening, said gutter having a plurality of side portions of which one rear side portion is raised higher than the other side portions, an interior plate which is capable of moving below said one raised rear side portion of the gutter between a closed position opposed to said opening and an open position retracted to a position rearwardly of the opening, drain conduits connected with said other side portions of the gutter, two of the other side portions being opposed to each other with the one raised rear side portion interposed therebetween, wherein a space is provided between said two side portions and separated from said two side portions by respective blocking means so as to block entry of water and other material, which have been guided into the two side portions, into the space and a connecting conduit of closed cross section disposed in said space and connected at opposite ends to each said blocking means at a passageway therethrough for guiding said water and other material.

2. A sun-roof apparatus according to claim 1 wherein the drain conduits are connected to corners of the gutter, respectively.

3. A sun-roof apparatus according to claim 1 wherein a drain plate is suspended from the peripheral edge of the opening and is received in said gutter.

4. A sun-roof apparatus according to claim 1 wherein opposite ends of said one raised rear side portion of the gutter are bent downward and are exposed onto said two opposed side portions of the gutter.

5. A sun-roof apparatus according to claim 3 wherein a weather strip is attached to a peripheral edge of the sun-roof panel in a manner coming into intimate contact with an inside surface of said drain plate.

6. A sun-roof apparatus according to claim 1 wherein said sun-roof panel is formed of a translucent material.

7. A sun-roof apparatus according to claim 1 wherein said sun-roof panel is opened and closed in a tilting manner by tilting means.

8. A sun-roof apparatus according to claim 7 wherein said sun-roof panel is opened and closed by an opening and closing unit.

9. A sun-roof apparatus according to claim 6 wherein said interior plate is a sunshade panel.

10. A sun-roof apparatus according to claim 1 wherein under the roof outer plate a rectangular sun-roof frame is arranged along a peripheral edge of the opening, and said gutter is partly formed integrally with the rectangular sun-roof frame.

11. A sun-roof apparatus for a vehicle, comprising: a sun-roof frame forming a gutter having at least two side portions and at least one raised rear portion at a higher height than said side portions, and interposed between said side portions, said gutter provided under a roof outer plate having an opening opened and closed by a sun-roof panel, wherein the gutter extends along at least three peripheral edges of the opening, an interior plate arranged under said at least one raised rear portion of the gutter, said interior plate being raised higher than said two side portions of the gutter and capable of moving between a closed position opposed to the opening and an open position moved backward to a rear of the opening, a drain conduit connected to each said at least two side portions of the gutter, a connecting passage arranged under the interior plate, wherein ends of the at least two side portions of the gutter which are close to said one raised side portion are connected by a recessed groove, said recessed groove being provided in said sun-roof frame in a manner continuous with said gutter side portions and at a position below said at least one raised rear portion of the gutter, and wherein said recessed groove contains a gear box of an opening and closing unit for controlling opening and closing the sun-roof panel, and a pair of bank plates are provided between the groove and the side portions of the gutter formed in the sun-roof frame, each said bank plate having an opening therein and said connecting passage connected to each said bank plate at said opening and arranged beneath the interior plate and with said groove.

12. A sun-roof apparatus according to claim 11 wherein said connecting passage is formed as a connecting conduit, said connecting conduit being contained in the groove and having opposite ends fixed to said pair of bank plates.

13. A sun-roof apparatus according to claim 1, further comprising an opening and closing unit for displacing said sun-roof panel, wherein said opening and closing unit having a gear box provided in said space.

14. A sun-roof apparatus according to claim 1, wherein said blocking means comprises a pair of bank plates which are provided between said space and said two side portions of the gutter, respectively.

15. A sun-roof apparatus according to claim 1, wherein said gutter other than its one raised rear side portion is formed in a rectangular sun-roof frame disposed to surround the peripheral edge of said opening, wherein a recessed groove is provided as said space in said sun-roof frame at a position below said one raised rear side portion so as to be continuous with one end of each of said two side portions.

16. A sun-roof apparatus according to claim 15, wherein said blocking means comprises a pair of bank plates which are provided between said recessed groove and said two side portions of the gutter.

* * * * *